United States Patent
Yassa et al.

(10) Patent No.: US 9,324,319 B2
(45) Date of Patent: Apr. 26, 2016

(54) METHOD AND APPARATUS FOR EXEMPLARY SEGMENT CLASSIFICATION

(71) Applicant: Speech Morphing Systems, Inc., Campbell, CA (US)

(72) Inventors: Fathy Yassa, Soquel, CA (US); Ben Reaves, Sunnyvale, CA (US)

(73) Assignee: SPEECH MORPHING SYSTEMS, INC., Campbell, CA (US)

( * ) Notice: Subject to any disclaimer, the term of this patent is extended or adjusted under 35 U.S.C. 154(b) by 36 days.

(21) Appl. No.: 14/262,668

(22) Filed: Apr. 25, 2014

(65) Prior Publication Data

US 2015/0019218 A1  Jan. 15, 2015

Related U.S. Application Data

(60) Provisional application No. 61/825,523, filed on May 21, 2013.

(51) Int. Cl.
*G10L 15/05* (2013.01)
*G10L 25/78* (2013.01)

(52) U.S. Cl.
CPC ........... *G10L 15/05* (2013.01); *G10L 25/78* (2013.01)

(58) Field of Classification Search
CPC .................. G10L 15/05; G10L 25/78
See application file for complete search history.

(56) References Cited

U.S. PATENT DOCUMENTS

| | | | | |
|---|---|---|---|---|
| 4,388,495 A * | 6/1983 | Hitchcock | ............... | G10L 15/00 704/254 |
| 5,617,508 A * | 4/1997 | Reaves | ............... | G10L 25/78 704/214 |
| 2005/0154580 A1* | 7/2005 | Horowitz et al. | ............... | 704/9 |
| 2008/0120102 A1* | 5/2008 | Rao | ............... | G10L 15/22 704/235 |

* cited by examiner

*Primary Examiner* — King Poon
*Assistant Examiner* — Ibrahim Siddo
(74) *Attorney, Agent, or Firm* — Sughrue Mion, PLLC

(57) ABSTRACT

Method and apparatus for segmenting speech by detecting the pauses between the words and/or phrases, and to determine whether a particular time interval contains speech or non-speech, such as a pause.

5 Claims, 9 Drawing Sheets

Processing flowchart

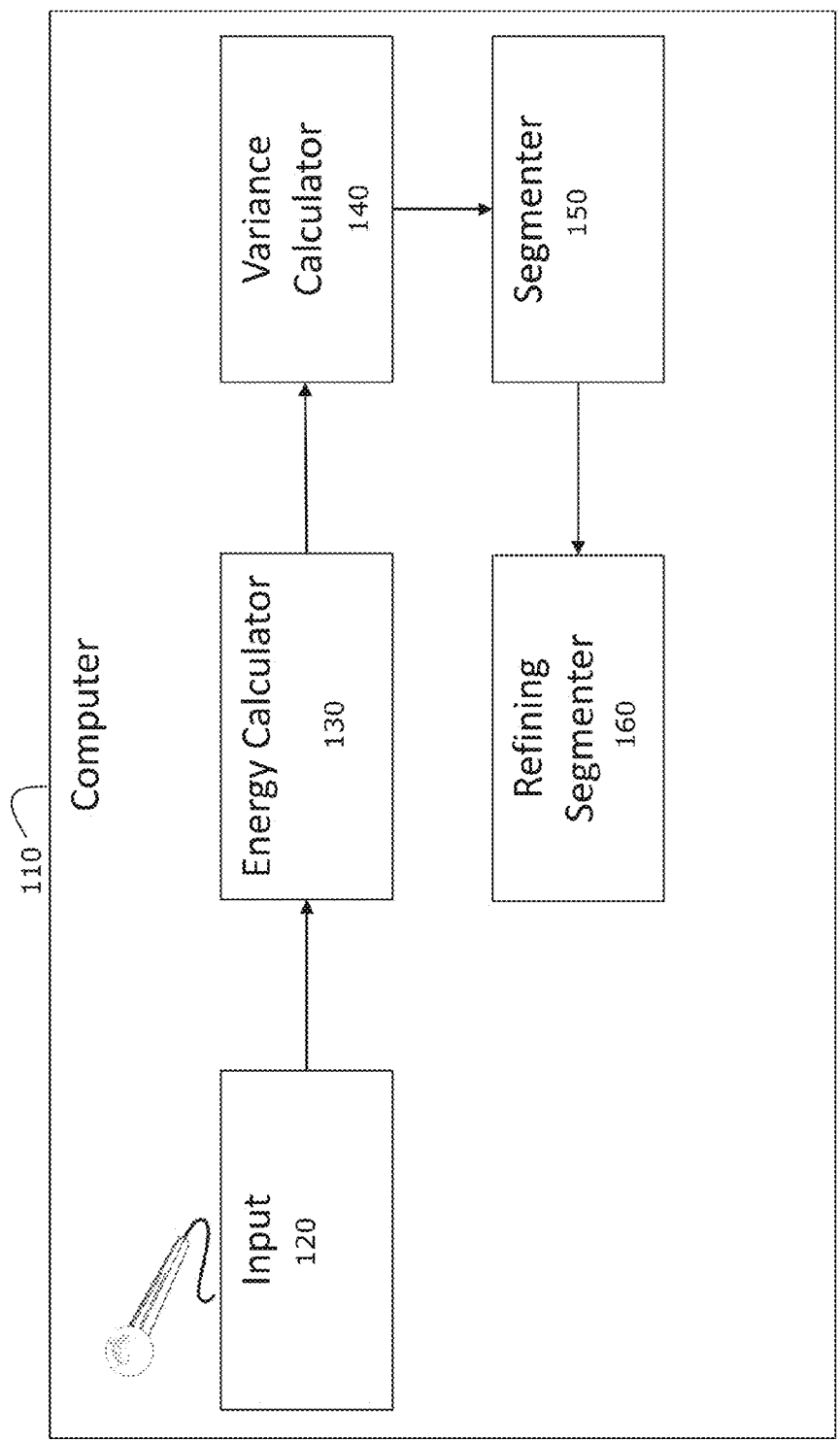
Fig.1 – System Level Diagram

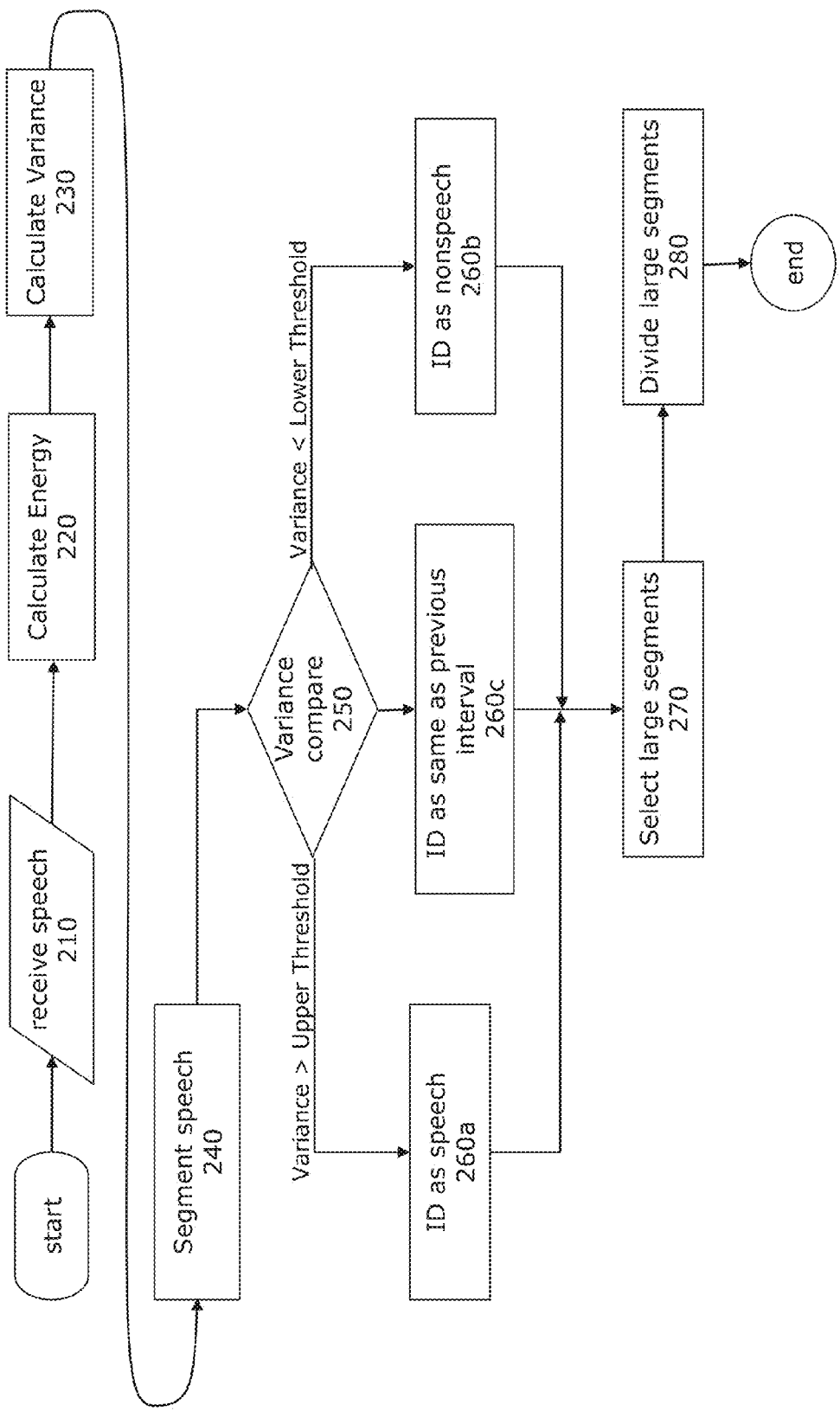
Fig.2 – Processing flowchart

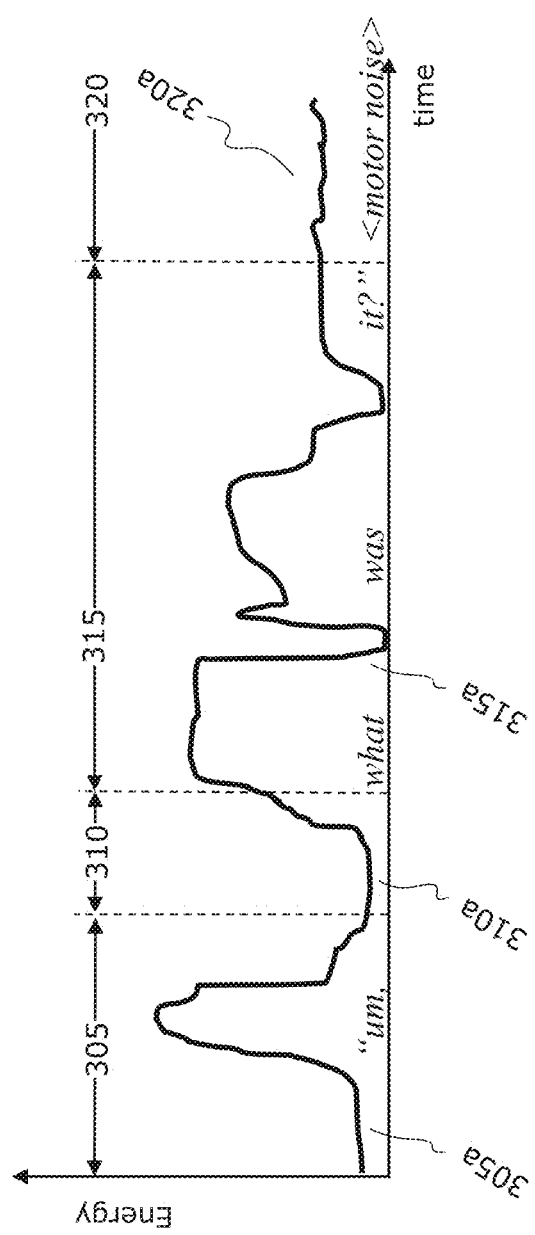
Fig.3a - Energy

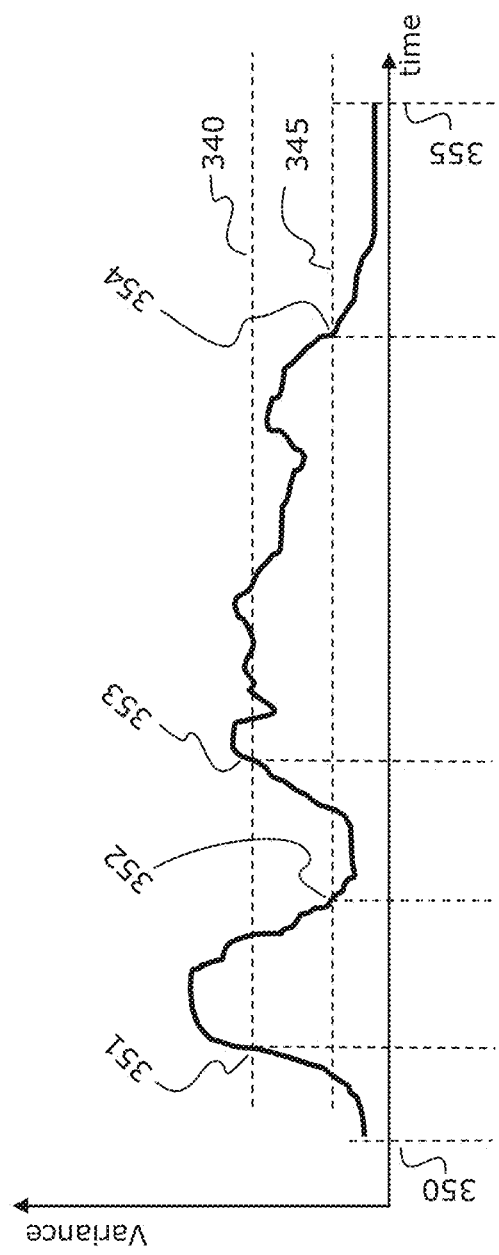
Fig.3b - plot of variance of Energy within window vs. time

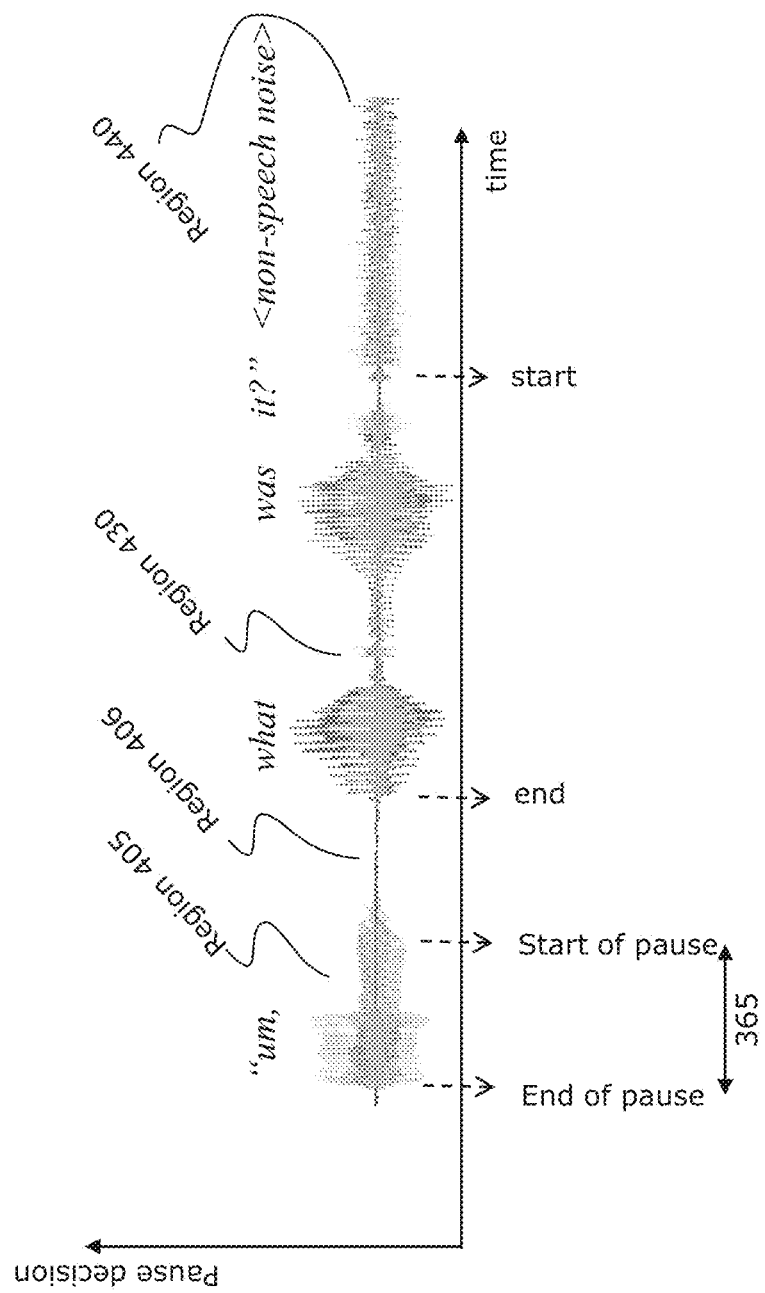
Fig. 4a - detection of pause locations

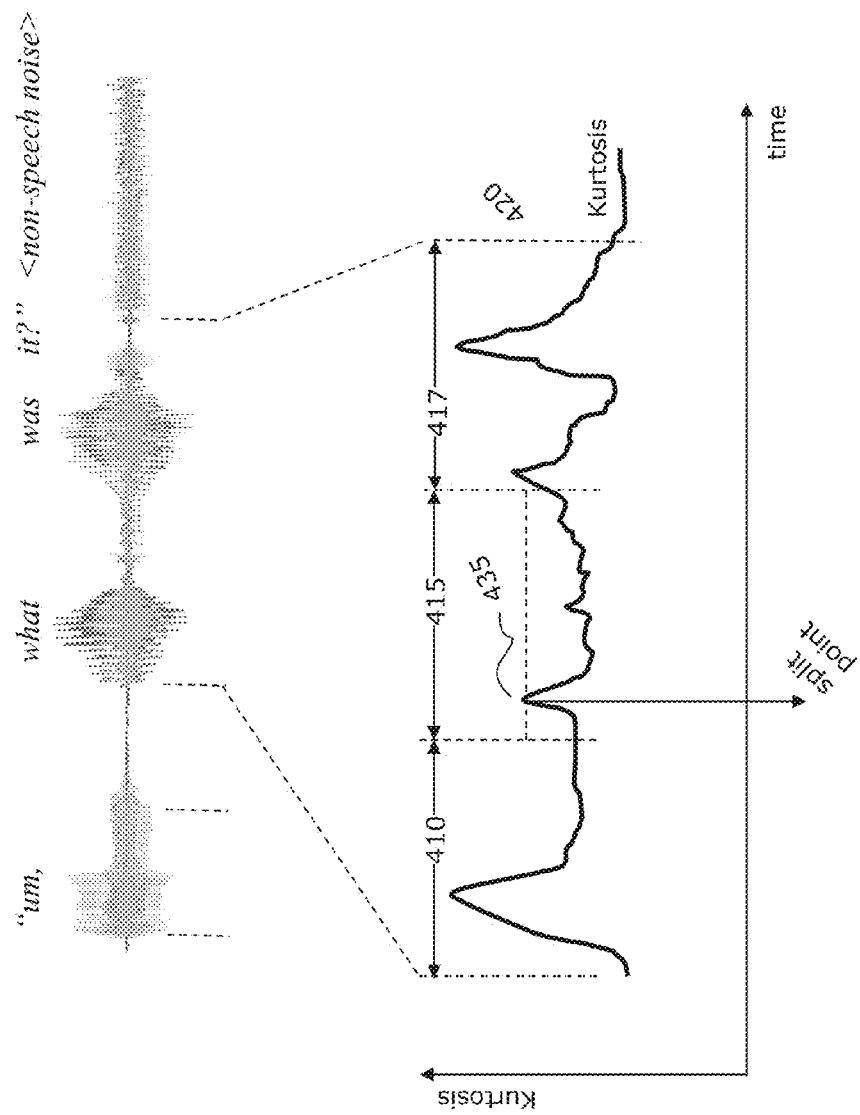
Fig. 4b – split lengthy segments, by Kurtosis

METHOD AND APPARATUS FOR EXEMPLARY SEGMENT CLASSIFICATION

CROSS-REFERENCE TO RELATED APPLICATION

The present application claims the benefit of U.S. Provisional Patent Application No. 61/825,523, filed on Apr. 25, 2013, in the U.S. Patent and Trademark Office, the disclosure of which is incorporated herein by reference in its entirety.

BACKGROUND

1. Field

Speech segmentation is the process of identifying the boundaries between words, syllables, or phonemes in spoken natural language. In all natural languages, the meaning of a complex spoken sentence (which often has never been heard or uttered before) can be understood only by decomposing it into smaller lexical segments (roughly, the words of the language), associating a meaning to each segment, and then combining those meanings according to the grammar rules of the language. The recognition of each lexical segment in turn requires its decomposition into a sequence of discrete phonetic segments and mapping each segment to one element of a finite set of elementary sounds (roughly, the phonemes of the language).

For most spoken languages, the boundaries between lexical units are surprisingly difficult to identify. One might expect that the inter-word spaces used by many written languages, like English or Spanish, would correspond to pauses in their spoken version; but that is true only in very slow speech, when the speaker deliberately inserts those pauses. In normal speech, one typically finds many consecutive words being said with no pauses between them.

2. Description of Related Art

Voice activity detection (VAD), also known as speech activity detection or speech detection, is a technique used in speech processing in which the presence or absence of human speech is detected. [1] The main uses of VAD are in speech coding and speech recognition. It can facilitate speech processing, and can also be used to deactivate some processes during non-speech section of an audio session: it can avoid unnecessary coding/transmission of silence packets in Voice over Internet Protocol applications, saving on computation and on network bandwidth.

SUMMARY

Aspects of the exemplary embodiments relate to systems and methods designed to segment speech by detecting the pauses between the words and/or phrases, i.e. to determine whether a particular time interval contains speech or non-speech, e.g. a pause.

BRIEF DESCRIPTION OF THE DRAWINGS

FIG. 1 illustrates a block diagram of a computer system for segmenting an input audio wave into speech segments, according to an exemplary embodiment.

FIG. 2 illustrates a flow diagram of a method of detecting pauses in speech, according to an exemplary embodiment.

FIG. 3a illustrates a graphical representation the energy of an input audio as a function of time.

FIG. 3b illustrates a graphical representation of the variance of the energy of the input audio within a given window as a function of time.

FIG. 4a illustrates a graphical representation of the location of pauses within the input audio wave FIG. 4b illustrates a graphic representation of kurtosis identifying the best place to divide a speech segment.

DETAILED DESCRIPTION OF THE EXEMPLARY EMBODIMENTS

Figure 1A:
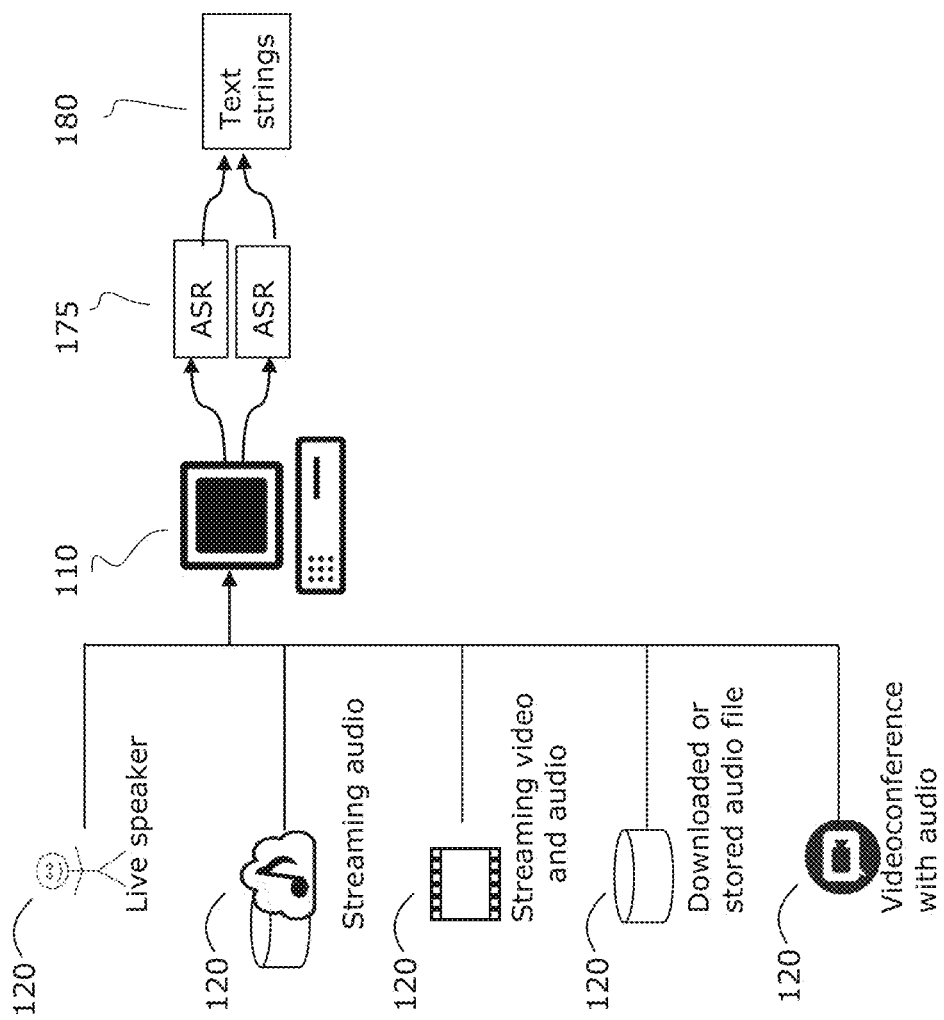
FIG. 1a illustrates another block diagram of a computer system for segmenting an audio waver into segments, according to an exemplary embodiment.

FIG. 1 illustrates a block diagram of a system for detecting pauses in speech, according to an exemplary embodiment.

The pause detecting system in FIG. 1 may be implemented as a computer system 110 is a computer comprising several modules, i.e. computer components embodied as either software modules, hardware modules, or a combination of software and hardware modules, whether separate or integrated, working together to form an exemplary computer system. The computer components may be implemented as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Input 120 is a module configured to receive human speech from any audio source, and output the received speech to the energy calculator 130. The audio source may be live speech, for example received from a microphone, recorded speech, for example speech recorded in a file, synthesized speech, etc. Energy Calculator 130 is a module configured to receive the speech output by the input module 120, calculate the energy of the waveform of the human speech, and output the calculated energy of the waveform to the calculator 140. The calculator 140 is a module configured to calculate the variance of the energy of the speech, based on the energy of the waveform output by the energy calculator 120, and output the calculated variance to the segmenter 150. The segmenter 150 is configured to receive the variance calculated by the calculator 140, break the speech into segments based upon the audio characteristic of the speech, and output the segments to the refining segmenter 160. Refining Segmenter 160 is configured to receive the segments from the segmenter 150 and further divide individual segments in which the individual segment duration is greater than acceptable for the intended application, e.g. an automatic speech recognizer ("ASR") which can only process 25 seconds of speech, or a close captioning system which can only process 10 second of speech.

FIG. 1a illustrates a component level diagram of the embodiments. Input 120 is a module configured to receive human speech from any audio source, and output the received speech to Computer system 110. Input 120 may be a live speaker, a module configured to stream audio, a feed from a videoconference with audio, a module configured to stream audio and video and/or a module configured to download or store audio or audio/video files. Computer System 110 is the computer system described above. ASR 175 is configured to receive the speech segments outputted by Computer System 110 and convert said segments into text. Text String 185 is the resulting output from the ASR.

Figure 1B:
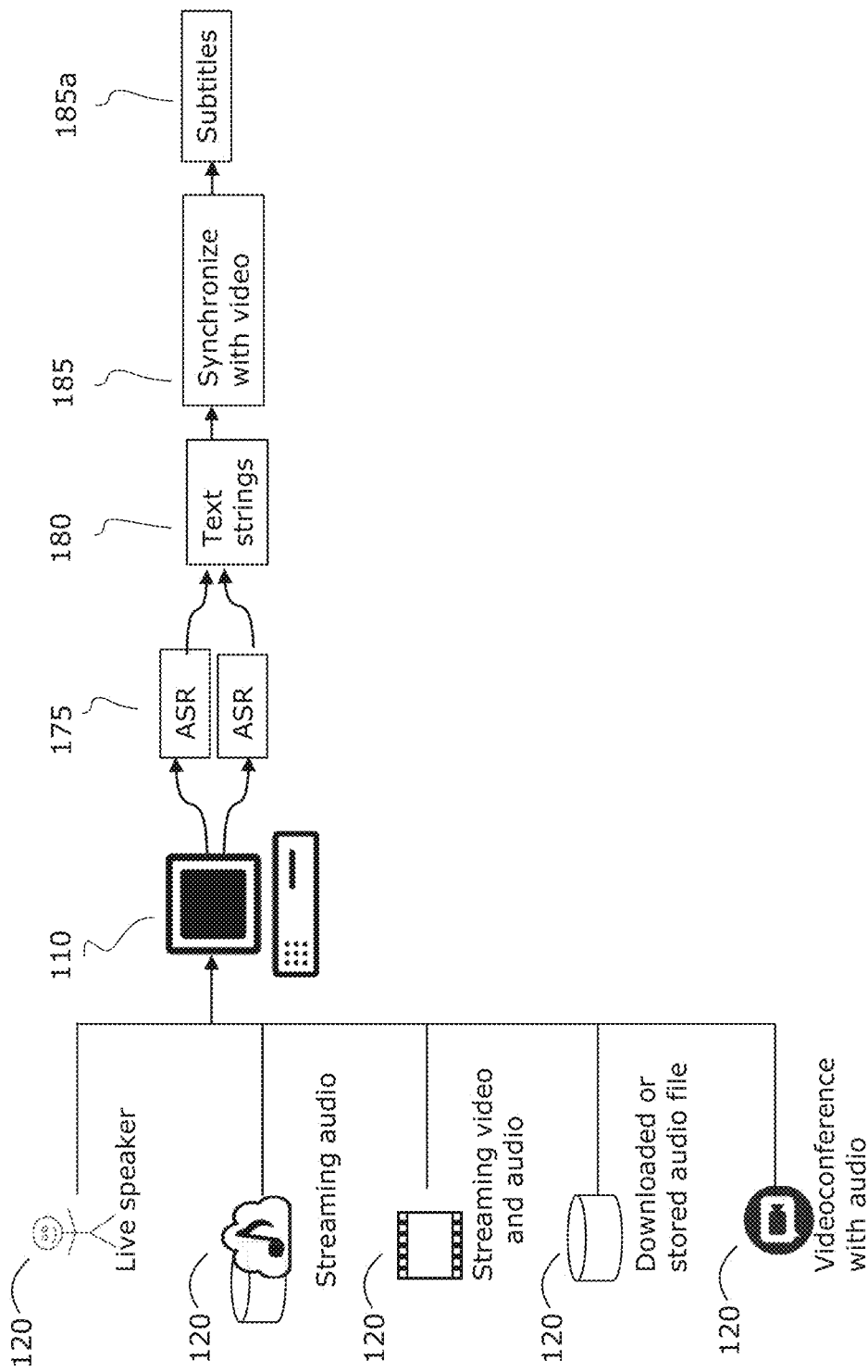
FIG. 1b illustrates another block diagram of a computer system for segmenting an audio waver into segments, according to an exemplary embodiment.

FIG. 1b illustrates a component level diagram further adding Video Synchronizer 185 configured to receive Text String 185 and synchronize it with any video that was received from Input 120 such that it can be received by Closed Captioning 185a, a module configured to receive the synchronized a text and video and display it as closed captioning.

Figure 1C:
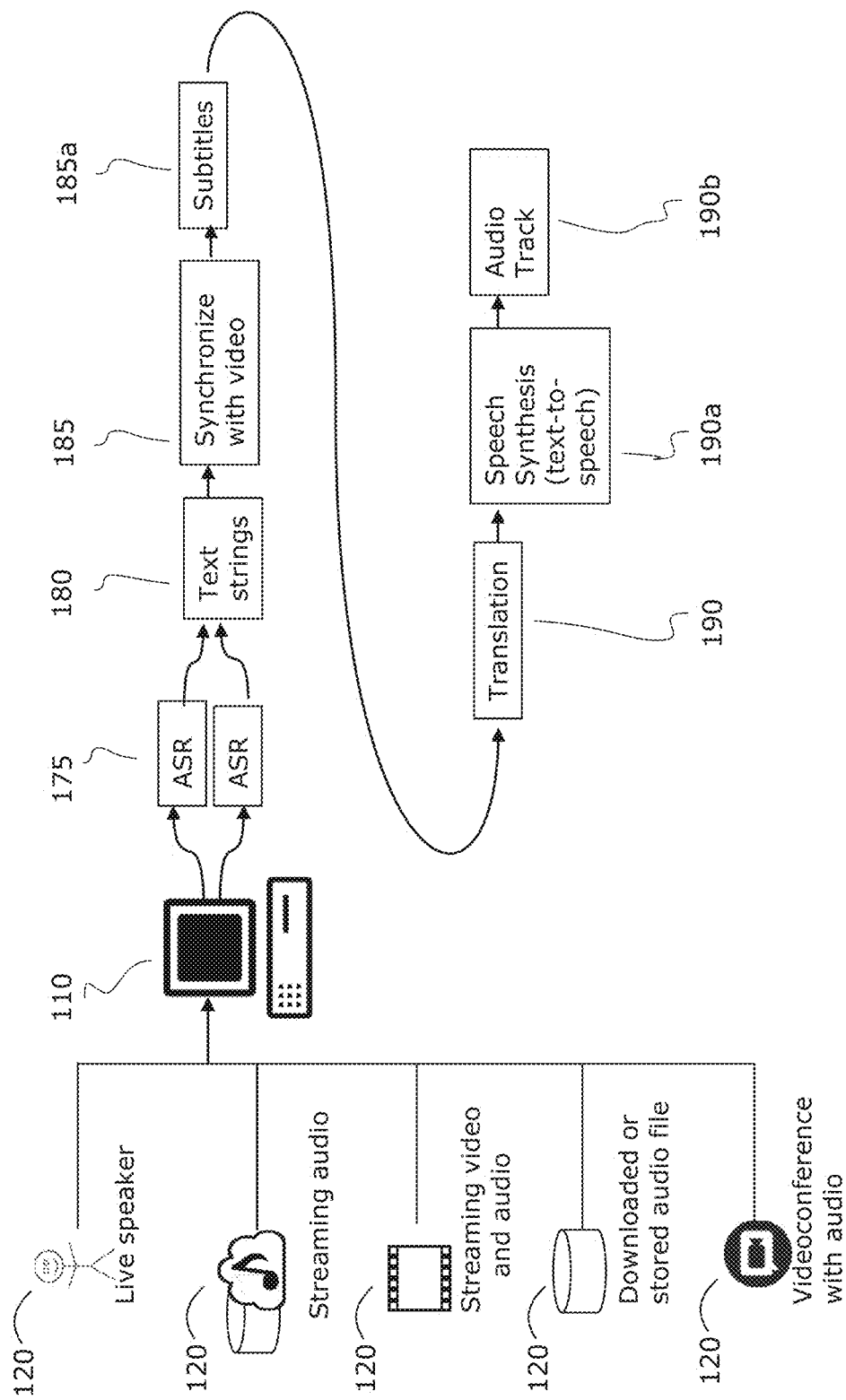
FIG. 1c illustrates another block diagram of a computer system for segmenting an audio waver into segments, according to an exemplary embodiment.

FIG. 1c illustrates a component level diagram further adding Translation 190, a module configured to translate the closed captioning text receive closed captioning 185a, TTS 190a, a module configured as a text to speech engine to convert the translated text into speech, and Audio Track 190b, a module configured to synchronize the audio output from TTS 190a with the input video to create an translated audio track.

FIG. 2 illustrates a flow diagram of a method detecting pauses in speech, according to an exemplary embodiment.

At step 210, Input 120 receives input audio data from any audio source which may include live speech, streaming audio and/or audio/video, downloaded audio and/or audio/video. Said audio source could be a live speech, recorded speech, synthesized speech, etc. At step 220 Calculator 120 calculates the energy E of speech waveform Y. In one embodiment, Calculator 120 determines the energy of the Y over an n second interval (t,t+n). Specifically $$E = Y(t, t+n)^2 \qquad \text{Eq. 1}$$

An n second interval is a standard interval commonly used amongst energy calculators.

At step 230, Calculator 140 calculates the variance S, or standard deviation, of the Energy E over an x second energy sample window which slides as energy is sampled at each n internal. Calculating the variance S is within the knowledge of one skilled in the art.

At step 240, Segmenter 150 segments Input 120 into speech segments with a granularity of n second interval. Segmenter 150 uses S to determine the beginning and ending of each speech segment in the waveform as will be discussed in detail below. At step 250, Segmenter 150 compares S with an upper and lower threshold determined according to exhaustive testing. In one embodiment of computer system 101, the upper and lower thresholds are one standard deviation from the mean of S over the entire speech. At step 260a, when the variance is greater than the upper threshold, Segmenter 150 classifies the interval as speech. Speech tends to have S due to its rhythmic nature. When the variance is below the lower threshold at step 260b Segmenter 150 determines the interval as non-speech. Non-speech generally lacks the high energy variance rhythmic nature of speech/ When the variance is between 2 the upper and lower threshold, at step 260c, Segmenter 150 determines the interval to be the same as the speech or non-speech determination of the previous interval. This gives stability to the classification, i.e. if the variance hovers at either the upper or lower threshold, segmenter 150 won't repeatedly change classification over a small time interval.

The segmenter 150 may classify segments as speech or non-speech as described above, for several reasons which include, reduce the amount of information that needs to be sent to an ASR, i.e. only speech is sent to an ASR.

At step 270, Refining Segmenter 160 selects segments which are too long in length by time, for the requirements of the desired output device, e.g. ASR, close captioning display, etc. For example, some speech recognizers can only accept segments of a given time length while close captioning standards for television limits the display of closed captioned information to ten seconds of speech. The determination of large segment is user determined based upon this desired end result. At step 280, Refining Segmenter 160 determines the maximum kurtosis of the middle region of a segment which is too large and divides the segments into smaller segments at the point of lowest kurtosis. Kurtosis is any measure of the "peakedness" of the probability distribution of a real-valued random variable, in this case, the input speech. At step 280 this division is repeated until all segments are of shorter time interval that the user set threshold.

Experimentally, dividing the large segment at the maximum kurtosis of the middle third is optimal. The goal is to divide the large segment at the best place for a speech recognizer to recognize the audio input considering such items as time constraints, time lag, etc., e.g. change of tone, pauses too short to be detected by changes in variance, and does not result in oversegmentation, e.g. dividing words or phrases.

FIG. 3a is a graph of the Energy E of a sample audio wave of the phrase "Um, what was it?" followed by background noise. Time Interval 305 represents the time interval of the word "Um"; the sampled intervals over which the word is spoken in the input speech). Energy 305a illustrates the energy of the word "Um" over Time Interval 305. Time Interval 310 represents the time interval over which there is no speech, i.e., the natural pause between "Um" and "what was it". Consequently its energy, Energy 310a is low and relatively unvarying, i.e. S is less than Threshold 345 as detailed in FIG. 3b. Time Interval 315 represents the time interval spanning the remainder of the phrase, i.e. "what was it". Time Interval 315 has insignificant pauses which are not detected by the classifying the variance in the energy. Energy 315a represents the energy of the speech over Time Interval 315. Time Interval 320 represents the background or motor noise. Energy 320a represents the energy of the background noise. Observationally, background noise tends to have relatively constant energy as shown in Energy 320a, while human speech is rhythmic, which has high variance.

FIG. 3b illustrates the variance of the energy E of the spoken phrase over sliding window discussed above. The variance of the energy is used to determine whether a particular time interval contains speech or non-speech. For purposes of this disclosure, non-speech or pauses includes, background noise, silence, etc. The input audio is identified as speech when the variance over the sliding window is greater than Threshold 340, signifying the rapid rhythmic changes characteristic of human speech and identified as non-speech when the variance is less than Threshold 345 signifying the gradual changes inherent is non-speech such as silence, motor noise, etc. When the audio is simultaneously greater than Threshold 345 and less than Threshold 340, its identification, i.e. speech or non-speech, remains unchanged from the previous identification until the variance crosses either Threshold 340 or Threshold 345. As explained above, this provides stability to the classifications. Experimentally Threshold 340 is one standard deviation below the mean of S across the entire input speech, while Threshold 345 is one standard deviation above the mean of S across the entire input speech.

In one embodiment of the invention, the segmentor 150 lacks the entire input speech, e.g. when Input 120 is a live speaker, streaming audio, etc. The mean of S is continually recalculated as more speech is obtained.

Time index 350 illustrates the variance at the beginning of the phrase "Um, what is it?" Time index 351 illustrates the first point where the variance exceeds Threshold 340 and is identified by Computer System 110 as speech, i.e. sample at point of large variance change begins speech? When Input 120 is a live speaker, streaming audio, or any input where the entire speech and its duration is unknown, computer system 110 stores the segment marked as speech in memory. Where input 120 is a downloaded file, or any input where the entire speech and its duration are known, computer system 110 stores only the time indexes of the beginning and ending time of each speech segment. Computer System 110 identified the audio input as speech until the variance becomes less than Threshold 345 at Time Index 352. The audio input remains identified as non-speech until Time Index 353, where the variance once again exceeds Threshold 340. The audio is identified as non-speech at Time Index 354 when the variance becomes less than Threshold 345.

FIG. 4a illustrates a representative waveform; Waveform 404 where the various lexical segments of the input audio "Um, where is it?" has been identified as speech or non-speech. Region 405, the "Um", is identified as a speech. Region 406 is identified as non-speech. Region 430 the phrase "where is it?" is identified as speech. Region 440, the motor in the background is identified as non-speech.

For purposes of this disclosure, Segment 405, the portion of Waveform 404 contained within Region 405, is within the acceptable size limit for a speech segment. Segment 430, the portion of Waveform 404, contained within Region 430, exceeds the acceptable size limit for a speech segment so it must be broken into smaller segments. The acceptable size limit for a segment is user determined. A speech segment has a duration that it too large if it causes acceptable lags, exceeds the threshold of the output device, e.g. ASR, etc. A speech segment is too small if it contains too little information, i.e. an incomplete phrase, such that the ASR lack context when attempting to recognize a word.

FIG. 4b illustrates the Kurtosis of the waveform 404 at Segment 430. Computer System 101 uses the Kurtosis as described below to determine the best place as described above to divide the segment. Computer System 101 divides Waveform 405 into Region 410, Region 415, and Region 417, calculates the Kurtosis over a Region 415 and selects Time Index 435, the local Kurtosis maximum, as the division point for Waveform 404. Computer system 110 chooses a middle region to avoid dividing segments near the speech segment edge where kurtosis tends to be higher thus generating many excessively small speech segments. In one embodiment of the invention, Region 410, Region 415, and Region 417 are each one third of the segment.

Computer system 110 repeats the process of dividing segments until each segment, is within the acceptable size limit, including segments created from the division of larger segments.

We claim:

1. A system configured to identify lexical segments in speech, the computer system comprising:
an input interface configured to receive an input of audio;
an energy calculation module configured to calculate energy of said audio over first time intervals of said audio;
a variance calculation module configured to calculate variance of the energy in the first time intervals of said audio over every second time interval within said first time intervals that slides as the energy calculation module calculates the energy of said audio at each of said first time intervals;
a speech segmentation module configured to determine whether the variance of the energy of said audio over each second time interval is greater than a threshold value of variance of the energy of said audio, determine for said audio over each of said second time intervals that said audio over each of said second time intervals contains speech in response to determining that the variance of the energy of said audio over each second time interval is greater than the threshold value, and determine lexical segment boundaries of said speech within the audio based on each of said second time intervals fluid audio that contains speech,
wherein the threshold value of variance of the energy of said audio is one standard deviation above a mean variance of energy of the audio signal.

2. The system of claim 1, further comprising:
a speech segmentation refinement module configured to segment the speech within the lexical segment boundaries and output the segmented speech to an output device configured to output said speech.

3. The system of claim 1, wherein the speech segmentation module is further configured to determine whether the variance of the energy of said audio over each second time interval is less than a lower threshold value of variance of the energy of said audio one standard deviation below the mean variance of energy of the audio signal, and determine for said audio over each of said second time intervals that said audio over each of said second time intervals does not contain speech in response to determining that the variance of the energy of said audio over each second time interval is less than the lower threshold value.

4. The system of claim 3, wherein the speech segmentation module is further configured to determine whether the variance of the energy of said audio over each second time interval is greater than the lower threshold value of variance of the energy of said audio and less than the threshold value of variance of the energy of said audio, and determine for said audio over each of said second time intervals having variance of the energy greater than the lower threshold value and less than the threshold value of variance that said audio over each of said second time intervals contains speech if a previous segment of said audio over a previous second time interval is determined to contain speech and does not contain speech if the previous segment of said audio over the previous second time interval is determined to not contain speech.

5. The computer system of claim 2, wherein the speech segmentation refinement module is further configured to segment the speech within the lexical segment boundaries according to kurtosis of the speech within the lexical segment boundaries.

* * * * *